Nov. 25, 1924.
H. MEIER
1,516,543
MACHINE TOOL
Filed Jan. 18, 1922   2 Sheets-Sheet 2
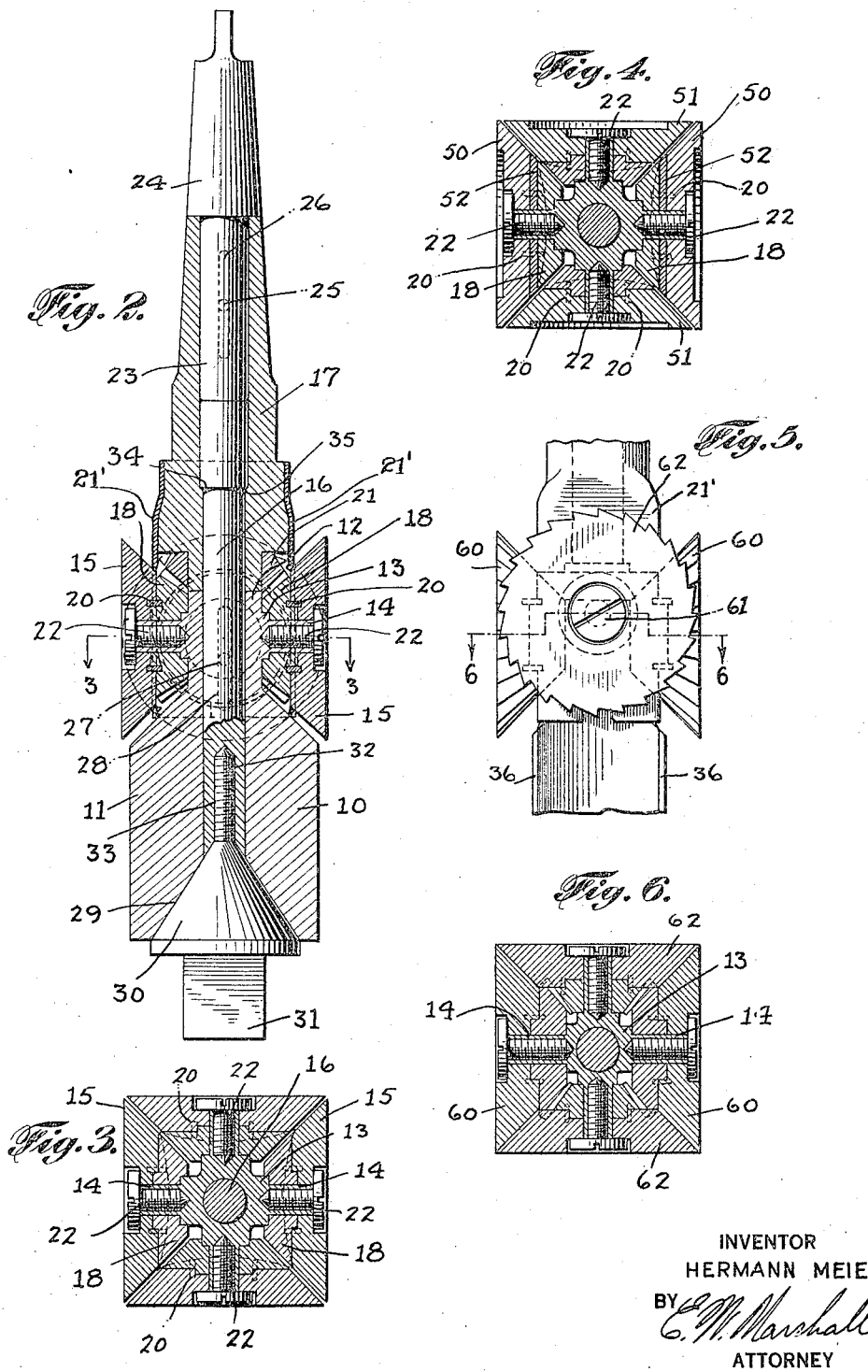
INVENTOR
HERMANN MEIER
BY E. W. Marshall
ATTORNEY Patented Nov. 25, 1924.

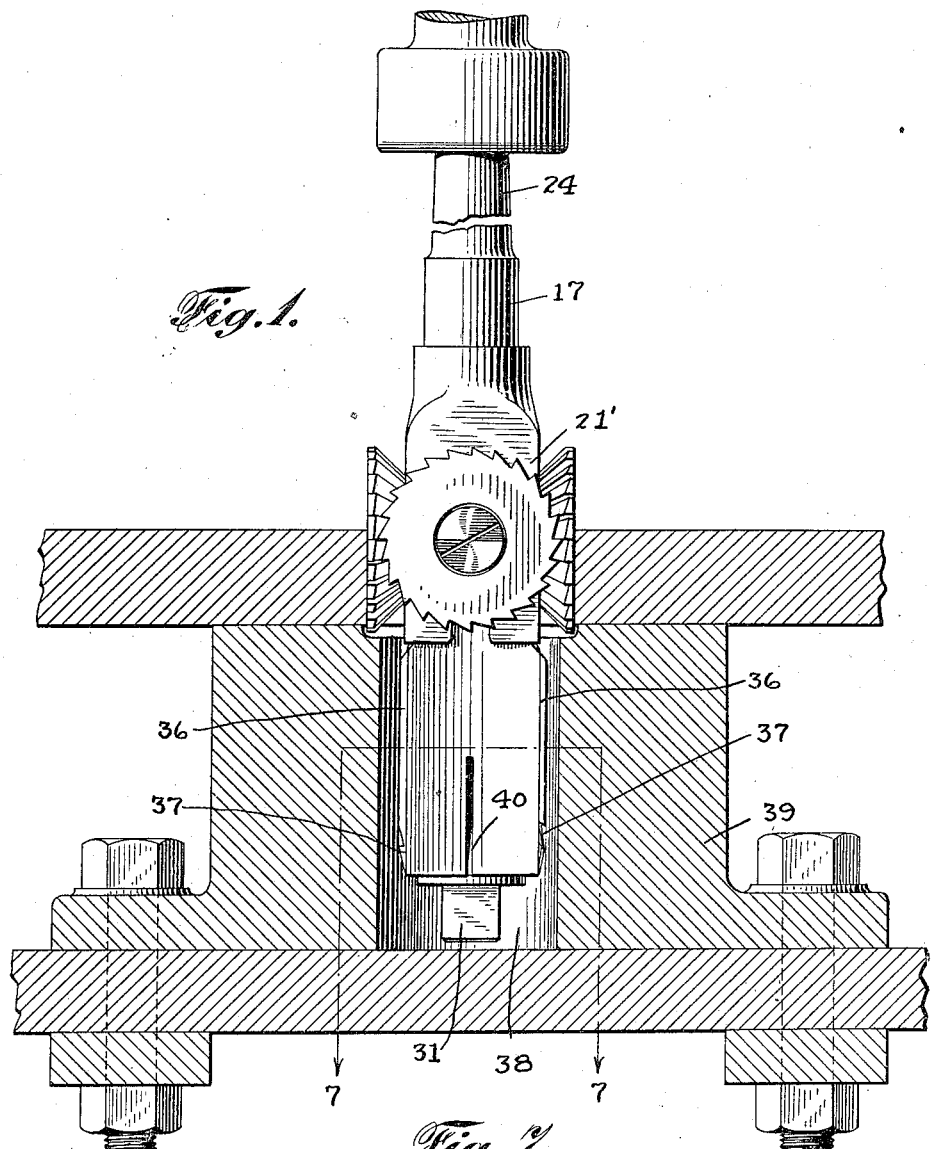
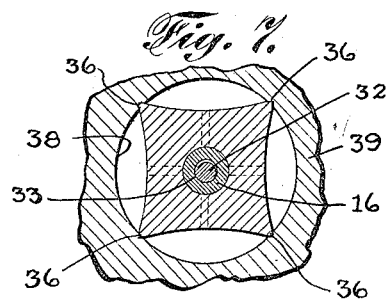

1,516,543

UNITED STATES PATENT OFFICE.

HERMANN MEIER, OF BREMEN, GERMANY.

MACHINE TOOL.

Application filed January 18, 1922. Serial No. 530,035.

*To all whom it may concern:*

Be it known that I, HERMANN MEIER, a citizen of Germany, and a resident of Bremen, Germany, have invented certain new and useful Improvements in Machine Tools, of which the following is a specification.

This invention relates to machine tools and particularly to a tool for cutting an angular hole.

One of the objects of the invention is to provide a device of the character described that is simple in construction and will effectively perform the desired function.

Another object of the invention is to provide a tool of the class described comprising few parts and so constructed that the parts can be easily assembled and will be maintained in proper cooperative position.

Another object of the invention is to provide a tool of the character described that will effect a clean and finished cut of angular section such as a triangular or quadrangular cut.

Another object of the invention is to provide a simple and effective method of cutting a hole of angular section.

Further objects of the invention will appear from the following specification taken in connection with the drawings which form a part of this application and in which—

Fig. 1 is an elevation of a tool constructed in accordance with my invention, the tool being shown in conjunction with the material in which the hole is cut and the material and its cooperating block being shown in section.

Fig. 2 is a sectional elevation of the cutting tool shown in Fig. 1.

Fig. 3 is a transverse sectional elevation taken substantially on line 3—3 of Fig. 2, but showing four cutters.

Fig. 4 is a sectional elevation similar to Fig. 3 but showing a modified form of the invention.

Fig. 5 is an elevation of a portion of another embodiment of the invention.

Fig. 6 is a transverse sectional view taken substantially on line 6—6 of Fig. 5, and Fig. 7 is a transverse sectional view taken substantially on line 7—7 of Fig. 1.

The invention may be briefly described as comprising a housing or support having a plurality of rotary cutters mounted on one portion thereof and having means such as sharp edges formed on another portion thereof to prevent rotation of the housing. In the particular embodiments of the invention shown the housing carries a shaft upon which is mounted a sleeve or hollow shaft adapted to be driven in any suitable manner. The sleeve or hollow shaft is operatively connected by driving connections to the rotary cutters carried by the support or housing. The axes of the cutters extend transversely with respect to the housing of the shaft. Means is also provided for maintaining the driving connections in proper adjustment. In certain embodiments of the invention the cutters are so relatively arranged as to effect a clean cut at the corners thereof forming an angular hole having a plurality of intersecting flat surfaces or faces.

Referring to the drawings I have shown a housing or support 10 having a longitudinally extending shank portion 11 and a portion 12 having laterally extending bosses 13 and sleeves 14 carried by and extending laterally from the bosses. In the embodiment of the invention shown in Figs. 1–3 inclusive, the bosses and sleeves which form the journals for the rotary cutters 15 are disposed substantially in the same plane and are located at right angles to each other. As shown in Fig. 2 the support or housing 10 is hollow and has mounted therein a shaft 16 which extends upwardly through the portion 12 of the housing and forms a bearing for a hollow shaft or sleeve 17.

Each sleeve 14 has mounted thereon a beveled gear 18 and a cutter 15 fixed to rotate with the gear by means such as pins 20. The gears 18 mesh with a beveled gear 21 carried by and fixed to the sleeve or hollow shaft 17. A casing 21' is mounted on the sleeve 17 and extends downwardly enclosing the gears 18 and the gear 21, as shown in Fig. 1 and 5, this casing having a smaller cross section than that of the shank 11 of the support or housing 10. The cutters 15 and gears 18 are secured to the sleeves 14 and support by means of screws 22 shown as left hand screws threaded into the sleeves 14. A shaft 23 abuts against the shaft 16 and is mounted in the hollow shaft or sleeve 17 extending outwardly beyond the end of this sleeve as shown at 24. The upper portion 24 of the shaft 23 is adapted to be placed in a chuck or secured to suitable driving means. The shaft 23 is connected to the sleeve 17 by a pin and slot connection 25, 26 and the shaft 16 is connected to the support or housing 10 by a pin and slot connection 27, 28.

The end of the shank portion 11 of the support is provided with a cone shaped recess 29 which receives a conical plug 30 having a squared end 31 and a longitudinally projecting screw 32, the screw 32 being threaded into an opening 33 formed in one end of the shaft 16. By rotating the plug 30 and screw 32 in the shaft 16 the sleeve 17 will be drawn toward the support 10 thereby forcing the gear 21 into proper meshing engagement with the gears 18. This adjustment is effected by reason of the fact that the shaft 16 has a shoulder 34 which seats against an annular shoulder 35 formed in the hollow shaft or sleeve 17.

In order to prevent the rotation of the support or housing 10 when the rotary cutters are being operated the shank portion 11 of this housing is preferably formed in the section shown in Fig. 7 from which it will be seen that a plurality of sharp corners 36 are formed on the shank portion. The ends of these edges are cut back slightly and are serrated as shown at 37, these serrations forming sharp teeth which cut their way into a cylindrical opening previously formed in the material to be cut and in case a cut is to be made entirely through the material a similar cylindrical hole 38 will be bored in a supporting block 39. The shank portion 11 is also slotted at its ends as shown at 40 to permit a slight expansion of the lower end of the shank and to permit the proper adjustment of the conical plug 30 in the conical opening 29 and to facilitate the adjustment of the parts.

In the particular embodiments of the invention shown four rotary cutters are illustrated but it will be understood that more cutters or fewer cutters may be used if desired, the number used and the particular shapes and sizes depending upon the form of the angular hole desired. In the form of the invention shown in Figs. 1–3 the cutters are slightly separated at their peripheries to provide for a clearance therebetween. It will be evident that the operation of this form of cutting tool will leave at the corners of the hole bored thereby a small amount of material which must be filed out if a clean hole having sharp corners is desired.

By the use of the construction shown in Figs. 4–6 however, a clean hole having sharp corners can be cut.

Referring first to Fig. 4 it will be noted that the cutters 50 are slightly wider or of greater diameter than the cutters 51 and overlap these latter cutters at their peripheries. The construction shown in Fig. 4 is substantially the same as that shown in Figs. 1–3 and differs therefrom only in respect to the overlapping feature just explained and in the fact that washers 52 are interposed between the gears 18 and the cutters 50.

In Figs. 5 and 6 the same result as that obtained by the construction shown in Fig. 4 can be obtained but in this construction cutters 60 are mounted on axes displaced longitudinally with respect to the axis of the housing and support from the axes 61 of the cutters 62. These cutters may therefore have the same diameter but because of their offset relation the corners of the hole are cut clean, no metal being left therein.

The operation of the tool will now be briefly described.

Before the tool is used a cylindrical hole is cut in the material in which the angular opening is to be formed, this cylindrical hole being of such a size, as illustrated in Fig. 7, that the sharp corners of the shank 11 of the support or housing will be forced into the wall of the hole when the tool is placed therein. This engagement of the corners of the shank 11 with the wall of the cylindrical opening will firmly hold the housing or support 10 against rotation. Thereafter, as the shaft 23 and the hollow shaft or sleeve 17 are rotated and the tool is forced downwardly, the cutters 15 will be rotated and will cut a hole of angular section through the member in connection with which the tool is being used.

The shank 24 may be engaged by the chuck of a drill-press or lathe and driven thereby, and the material to be cut or its supporting block 39 held on other parts of such a machine.

As above stated it should be understood that I do not intend to be limited to any particular number of cutters or the particular shapes of cutters or to the specific forms of the invention shown but that further changes in the construction and in the arrangement of the various cooperating parts may be made without departing from the spirit or scope of the invention as expressed in the following claims.

What I claim is:—

1. A tool comprising a shaft, a housing mounted thereon and having a longitudinally extending shank, angular in section, the corners of the shank having sharp cutting edges, and rotary cutters carried by said housing on axes transverse to the houseing and shaft.

2. A tool comprising a shaft, a housing mounted thereon and having a longitudinally extending shank, angular in section, the corners of the shank having sharp cutting edges, and cutter teeth on said edges adjacent the end of the shank, and rotary cutters carried by said housing on axes transverse to the housing and shaft.

3. A tool comprising a shaft, a housing mounted thereon and having a longitudinally extending shank, angular in section, the corners of the shank having sharp cutting edges, and rotary cutters carried by said housing on axes transverse to the housing and shaft, the shank of the housing having its maximum dimension less than the minimum dimension of the bore cut by said cutters.

4. A tool comprising a support, cutters mounted thereon for rotation on axes transverse to the support, operative driving connections for the cutters, and means for adjusting the driving connections to maintain said connections in proper adjustment.

5. A tool comprising a support, a plurality of angularly arranged cutters mounted thereon, a drive shaft, a bevel gear mounted thereon, bevel gears fixed to the cutters and carried by the support, meshing with the driving gear and means for adjusting the cutter gears to maintain said gears in proper mesh with the driving gear.

6. A tool comprising a support, a plurality of angularly arranged cutters mounted thereon, a drive shaft, a bevel gear mounted thereon, bevel gears fixed to the cutters and carried by the support, meshing with the driving gear, and means for adjusting the support to maintain the cutter gears in proper mesh with the driving gear.

7. A tool comprising a support having a shank portion and a portion having laterally extending bearings, rotary cutters mounted on said bearings, a shaft extending through said support, a sleeve mounted thereon and driving connections between said sleeve and said cutters.

8. A tool comprising a support having a shank portion and a portion having laterally extending bearings, rotary cutters mounted on said bearings, a shaft extending through said support, a sleeve mounted thereon, a gear secured to said sleeve, gears secured to said cutters meshing with said gear and means for relatively adjusting the cutter gears and the gear on said sleeve.

In witness whereof, I have hereunto set my hand this thirtieth day of December, 1921.

HERMANN MEIER.